US010190426B2

(12) United States Patent
Fremont (10) Patent No.: US 10,190,426 B2
(45) Date of Patent: Jan. 29, 2019

(54) STATOR SECTOR FOR A TURBINE ENGINE, AND A METHOD OF FABRICATING IT

(71) Applicants: HERAKLES, Le Haillan (FR); SAFRAN AIRCRAFT ENGINES, Paris (FR)

(72) Inventor: Elric Fremont, Le Perreux (FR)

(73) Assignees: SAFRAN CERAMICS, Le Haillan (FR); SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 15/123,499

(22) PCT Filed: Mar. 3, 2015

(86) PCT No.: PCT/FR2015/050512
§ 371 (c)(1),
(2) Date: Sep. 2, 2016

(87) PCT Pub. No.: WO2015/132523
PCT Pub. Date: Sep. 11, 2015

(65) Prior Publication Data
US 2017/0074110 A1 Mar. 16, 2017

(30) Foreign Application Priority Data
Mar. 6, 2014 (FR) ...................................... 14 51824

(51) Int. Cl.
*F01D 9/04* (2006.01)
*F01D 25/00* (2006.01)

(52) U.S. Cl.
CPC ............. *F01D 9/042* (2013.01); *F01D 9/041* (2013.01); *F01D 25/005* (2013.01);
(Continued)

(58) Field of Classification Search
CPC ........ F01D 9/042; F01D 9/041; F01D 25/005; F05D 2230/10; F05D 2230/50;
(Continued)

(56) References Cited

U.S. PATENT DOCUMENTS 2,772,856 A * 12/1956 Armer .................... F01D 9/042
415/209.1
6,409,472 B1 * 6/2002 McMahon ............ F01D 5/3023
415/119
(Continued)

FOREIGN PATENT DOCUMENTS

EP 1 213 484 A1 6/2002
EP 1 626 163 A2 2/2006
(Continued)

OTHER PUBLICATIONS

Machine translation of Hiernaux et al. (EP 2072760 A1) courtesy of Espacenet.*
(Continued)

*Primary Examiner* — Richard Edgar
*Assistant Examiner* — Danielle M Christensen
(74) *Attorney, Agent, or Firm* — Pillsbury Winthrop Shaw Pittman LLP (57) ABSTRACT

A sector for a turbine stator includes vanes made of composite material, each including an airfoil extending between first and second ends. The sector has first and second platforms made of composite material, the first platform having openings in which the first ends of the vanes are engaged, and the second platform having openings in which the second ends of the vanes are engaged. The openings in the first platform present dimensions greater than the dimensions of the first ends of the vanes engaged in the openings so as to leave clearance between the first end of each vane and the opening. Each vane first end engaged in an opening presents dimensions that are less than the dimensions of the airfoil so as to define a shoulder extending around the first end. The shoulder presents dimensions that are greater than the dimensions of the openings in the first platform.

10 Claims, 10 Drawing Sheets (52) U.S. Cl.
CPC ...... *F05D 2230/10* (2013.01); *F05D 2230/50* (2013.01); *F05D 2230/60* (2013.01); *F05D 2240/128* (2013.01); *F05D 2240/80* (2013.01); *F05D 2300/603* (2013.01); *F05D 2300/6032* (2013.01); *F05D 2300/6033* (2013.01); *Y02T 50/672* (2013.01)

(58) Field of Classification Search
CPC .......... F05D 2230/60; F05D 2240/128; F05D 2240/80; F05D 2300/6032
See application file for complete search history.

(56) References Cited

U.S. PATENT DOCUMENTS

| | | | | |
|---|---|---|---|---|
| 6,648,597 | B1 * | 11/2003 | Widrig | F01D 9/044 415/200 |
| 2005/0254942 | A1 * | 11/2005 | Morrison | F01D 5/282 415/200 |

FOREIGN PATENT DOCUMENTS

| | | | |
|---|---|---|---|
| EP | 1 905 956 A2 | 4/2008 | |
| EP | 2072760 A1 * | 6/2009 | ............ F01D 9/042 |
| FR | 2979573 A1 * | 3/2013 | ............ B29C 70/24 |
| GB | 865545 A * | 4/1961 | ............ F01D 9/042 |
| WO | WO 2010/061140 A1 | 6/2010 | |
| WO | WO 2010/116066 A1 | 10/2010 | |
| WO | WO 2010/146288 A1 | 12/2010 | |
| WO | WO 2011/080443 A1 | 7/2011 | |

OTHER PUBLICATIONS

International Preliminary Report on Patentability and the Written Opinion of the International Searching Authority as issued in International Patent Application No. PCT/FR2015/050512, dated Sep. 6, 2016.

International Search Report as issued in International Patent Application No. PCT/FR2015/050512, dated Apr. 21, 2016.

* cited by examiner

STATOR SECTOR FOR A TURBINE ENGINE, AND A METHOD OF FABRICATING IT

CROSS-REFERENCE TO RELATED APPLICATIONS

This is the U.S. National Stage of PCT/FR2015/050512, filed Mar. 3, 2015, which in turn claims priority to French Patent Application No. 1451824, filed Mar. 6, 2014, the entire contents of all applications are incorporated herein by reference in their entireties.

BACKGROUND OF THE INVENTION

The invention relates to turbine engine stators. The specific field is that of compressors or guide vane sets of gas turbines for aeroengines or industrial turbines.

Improving the performance of turbine engines and reducing their polluting emissions leads to envisaging ever-higher operating temperatures. For elements in the hot portions of turbine engines, proposals have therefore been made to use ceramic matrix composite (CMC) materials. These materials possess remarkable thermostructural properties, i.e. mechanical properties that make them suitable for constituting structural elements, together with the ability to conserver those properties at high temperatures. Furthermore, CMC materials are of density that is much less than the density of the metal materials traditionally used for elements in the hot portions of turbine engines.

Thus, Documents WO 2010/061140, WO 2010/116066, and WO 2011/080443 describe making blades for turbine engine rotor wheels out of CMC with incorporated inner and outer platforms. The use of CMC materials for turbine nozzles has also been proposed, in particular in Document WO 2010/146288.

A conventional turbine nozzle or compressor guide vane set made of metal is made up of a plurality of sectors that are assembled together, each sector having an inner platform, an outer platform, and a plurality of vanes extending between the inner and outer platforms and secured thereto. The inner and outer platforms define the gas or air flow passage through the nozzle or guide vane set. On the outside the outer platforms of the sectors are secured to tabs enabling the turbine nozzle or compressor stator to be mounted in a casing.

Document EP 1 213 484 describes a compressor stator stage made out of metal material by assembling the vanes between an inner shroud and an outer shroud, the inner and outer ends of the vanes being secured respectively to the inner shroud and to the outer shroud via respective single strips. Under such circumstances, locking the vanes relative to the inner or outer platforms by means of a continuous strip raises problems of alignment between the vanes. Specifically, such a locking technique requires a large amount of clearance to be provided between the vanes in order to enable them to be aligned relative to the strip. Such clearance is unacceptable in a low pressure nozzle or stator since it leads to excessive leaks and head losses within the engine.

Document EP 1 626 163 describes a compressor stator made of metal material having vanes that are assembled between an inner shroud and outer shroud, with a large amount of clearance being provided in particular between the slots in the inner shroud and the inner ends of the vanes. As for Document EP 1 213 484, such clearance cannot be tolerated where the internal passage is being defined since it leads to excessive leaks in the engine.

OBJECT AND SUMMARY OF THE INVENTION

An object of the invention is to provide a method enabling a stator sector to be fabricated, in particular a turbine nozzle or a compressor guide vane set, out of composite material while reproducing the various functions of a metal sector, in particular the function of defining the gas or air flow passage by means of inner and outer platforms and the function of attachment within a casing. Another object of the invention is to enable such a stator sector to be made in simplified manner by assembling together elementary elements, with this being possible without generating leaks at the locations where the vanes and the platforms are assembled together.

This object is achieved by a method of fabricating a sector of a turbine engine stator, the method comprising:
  making a plurality of single-piece vane fiber blanks;
  shaping the fiber blanks in order to obtain single-piece vane fiber preforms;
  densifying the vane preforms with a matrix in order to obtain composite material vanes, each comprising fiber reinforcement constituted by the preform and densified by the matrix;
  machining each vane to form a first end and a second end defining between them an airfoil, each first end having dimensions smaller than the dimensions of the airfoil so as to define a shoulder extending around the first end;
  making respective slots or notches in the first and second ends of the vanes;
  making a fiber blank for a first platform and a fiber blank for a second platform;
  shaping the fiber blanks to obtain a single-piece fiber preform for the first platform in the form of a circular arc and a single-piece fiber preform for the second platform in the form of a circular arc;
  densifying the preforms for the first and second platforms with a matrix in order to obtain first and second platforms made of composite material and in the form of circular arcs comprising fiber reinforcement constituted by the preform and densified by the matrix;
  making openings in the first and second platforms, the openings of the first platform presenting dimensions greater than the dimensions of the first ends of the vanes, the shoulder extending around each first end presenting dimensions greater than the dimensions of the openings in the first platform;
  engaging the second ends of the vanes in the openings of the second platform;
  placing a locking element in each slot or notch at the second ends of the vanes;
  engaging the first ends of the vanes in the openings of the first platform; and
  placing a locking element in each slot or notch at the first ends of the vanes.

Thus, by making openings in the first platform that present dimensions greater than the dimensions of the first ends of the vanes and by making a shoulder that extends around each first end that presents dimensions greater than the dimensions of an opening in the first platform, it is possible to leave clearance between the inner ends of the vanes and the openings in the inner platform so as to make them easier to assemble together. Specifically, when the second ends of the vanes are already engaged in and secured to the openings in the second platform which is of circularly arcuate shape, it is no longer possible to engage the first ends of the vanes in the openings in the first platform unless those openings are of dimensions sufficient to leave clearance relative to the first ends of the vanes. In contrast, since the first ends of the vanes are surrounded by respective shoulders of dimensions greater than the dimensions of the openings in the first preform, the shoulders serve to mask from the flow passage the clearance that is present between the first ends and the openings in the first platform, thereby enabling the stator to be leaktight where the inside of the passage is defined.

Furthermore, choosing to provide clearance for facilitating assembly between the vanes and the platforms enables the vanes to be mass produced to a common design, and consequently makes it possible to reduce the number of different kinds of part needed for making a stator sector. This serves to reduce the time and the cost of fabricating such a stator sector.

According to a particular characteristic of the method of the invention, the vanes, the first platform, the second platform, and the locking elements are made of ceramic matrix composite (CMC) material.

The invention also provides a sector for a turbine stator, the sector comprising a plurality of vanes of composite material comprising fiber reinforcement densified by a matrix, each vane having an airfoil extending between a first end and a second end, said sector also comprising a first platform and a second platform, the platforms being in the form of circular arcs and made of composite material comprising fiber reinforcement densified by a matrix, the first platform having openings in which the first ends of the vanes are engaged, and the second platform having openings in which the second ends of the vanes are engaged, the sector being characterized in that the openings in the first platform present dimensions that are greater than the dimensions of the first ends of the vanes engaged in said openings so as to leave clearance between the first ends of each of the vanes and the openings, and in that each vane first end engaged in said opening presents dimensions smaller than the dimensions of the airfoil so as to define a shoulder extending around said first end, the shoulder presenting dimensions greater than the dimensions of the openings of the first platform and being in contact with the surface of the first platform.

According to a first characteristic of the sector of the invention, the portion of the second end of each vane extending beyond the second platform includes at least one slot or notch in which a locking element is placed.

According to a second characteristic of the sector of the invention, the portion of the first end of each vane extending beyond the first platform includes at least one slot or notch in which a locking element is placed.

According to a third characteristic of the sector of the invention, the vanes, the first platform, and the second platform are made of ceramic matrix composite (CMC) material.

According to a fourth characteristic of the sector of the invention, the first platform corresponds to the inner platform of the stator sector and in that the first end of the airfoil corresponds to the inner end of said airfoil, the second platform corresponding to the outer platform of said stator sector and the second end of the airfoil corresponding to the outer end of said airfoil.

The present invention also provides:
a turbine engine stator having a plurality of sectors of the invention;
a turbine engine compressor having a stator of the invention; and
a turbine engine having a compressor of the invention.

BRIEF DESCRIPTION OF THE DRAWINGS

The invention can be better understood from the following description given by way of non-limiting indication and with reference to the accompanying drawings, in which.

DETAILED DESCRIPTION OF EMBODIMENTS

The invention is applicable to various types of gas turbine stator, and in particular low pressure nozzles or guide vane sets of a turbine engine.

Figure 1A:
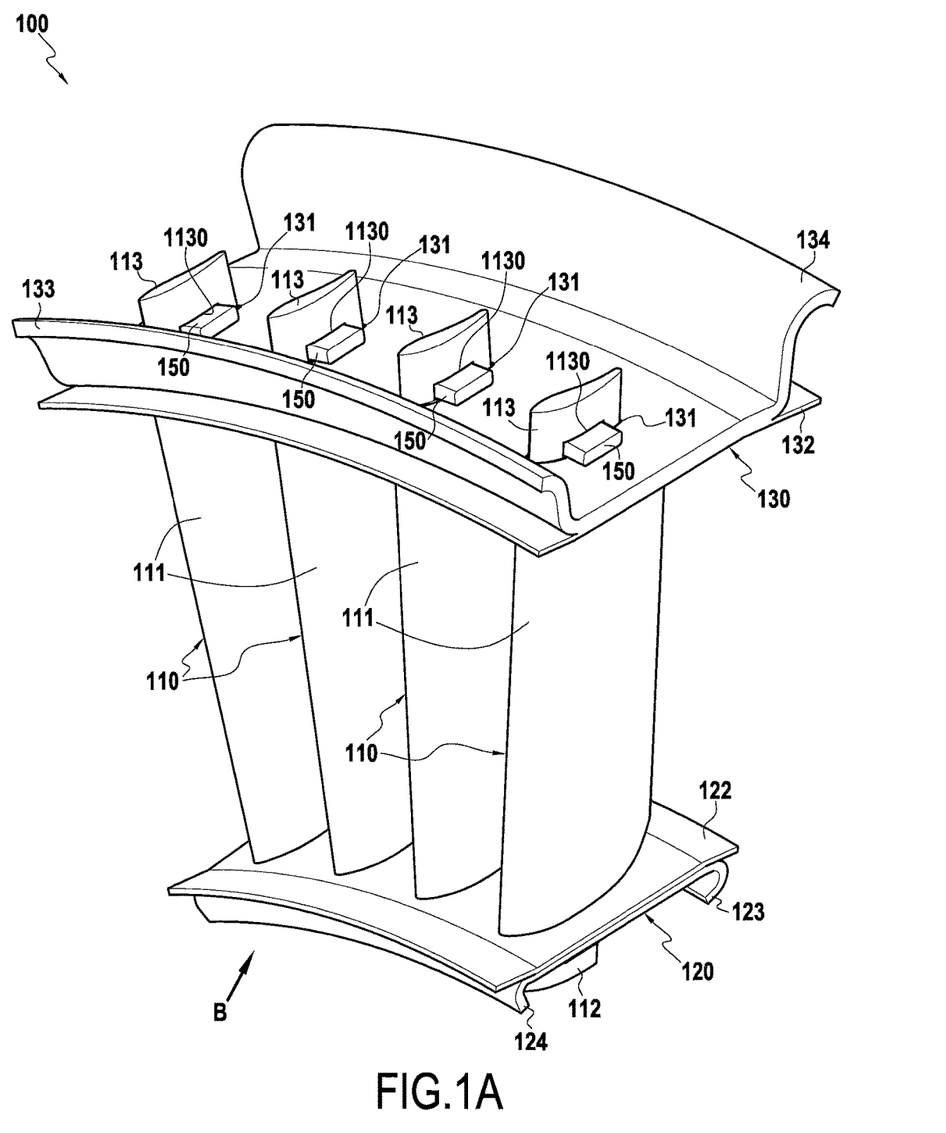
FIGS. 1A and 1B are perspective views of a turbine engine stator sector in accordance with an embodiment of the invention.
Figure 1B:
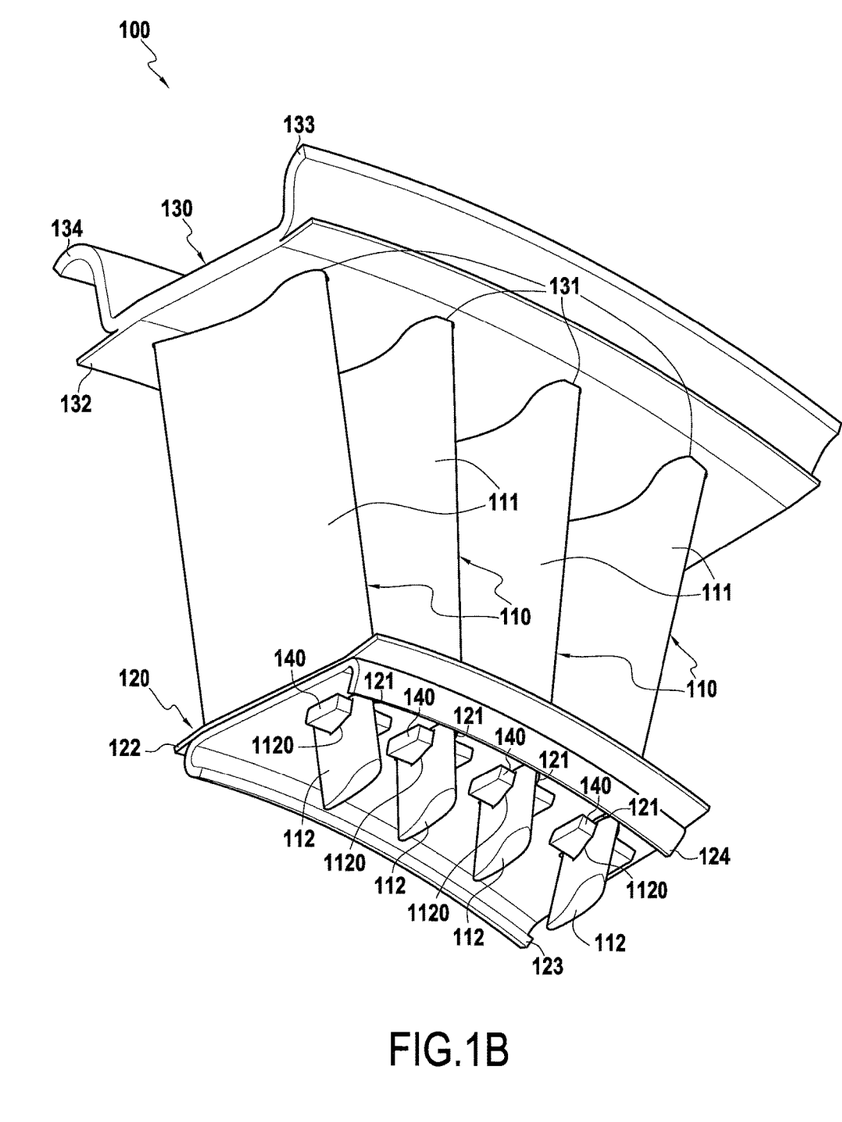

FIGS. 1A and 1B show a stator sector 100 in accordance with an embodiment and corresponding to a portion of a low pressure nozzle of a turbine engine. The stator 100 in this example has four vanes 110, an inner platform 120, and an outer platform 130, the inner and outer platforms 120 and 130 being in the form of circular arcs.

Throughout the specification, the term "outer platform" or "inner platform" is used interchangeably to designate either a two-function platform having a portion forming a platform for constituting a flow passage and a portion forming attachment tabs or hooks or nibs, or else a single-function platform that is limited to only one of these portions.

The term "platform for constituting a flow passage" is used to designate an element forming a portion of an outer or inner wall defining the gas flow passage in a turbine through a turbine nozzle or the air flow passage in a compressor through a compressor guide vane set.

Throughout the present specification, the terms "inner" and "outer" are used with reference to position or orientation relative to the axis of the turbine.

The outer platform 130 includes a platform 132 constituting a flow passage. On the outside of the platform 132 constituting a flow passage, there project an upstream attachment tab 133 and a downstream attachment tab 134 in the form of angular sectors of substantially S-shaped section. The attachment tabs 133, 134 extend over the same angle as the platform 132. The end portions of the tabs 133, 134 point respectively upstream and downstream and are for being engaged in hooks carried by an aeroengine casing (not shown in FIGS. 1A and 13) in a manner similar to that used for a metal turbine nozzle.

Throughout the specification, the terms "upstream" and "downstream" are used relative to the flow direction of the gas stream through the turbine engine.

The outer platform 120 has a platform 122 constituting a flow passage. On the inside of the inner platform 120 there project upstream and downstream hooks 123 and 124 that are in the form of annular sectors of substantially C-shaped section, and they are folded respectively downstream and upstream.

The hooks 123 and 124 are for supporting and holding axially in position a sealing system for the adjacent rotor disks in the engine (not shown in FIGS. 1A and 1B).

Each vane comprises an airfoil 111 that extends between an inner end 112 and an outer end 113. The inner platform 120 has openings 121 in which the inner ends 112 of the vanes 110 are engaged, while the outer platform 130 has openings 131 in which the outer ends 113 of the vanes 110 are engaged. The inner platform 120 is secured to the inner ends 112 of the vanes 110 via mortise-and-tenon type connections made by locking elements or keys 140, each inserted in a slot or notch 1120 formed in the portion of each inner end 112 that is situated beyond the inner platform 120 (FIG. 1B). The outer platform 130 is secured to the outer ends 113 of the vanes 110 via a mortise-and-tenon type connection provided by locking elements or keys 150, each inserted in a slot or notch 1130 formed in the portion of each outer end 113 that is situated beyond the inner platform 120 (FIG. 1A).

In accordance with the invention, the vanes 110, the inner platform 120, the outer platform 130, and the locking elements 140 and 150 are each made independently of one another.

Figure 2:
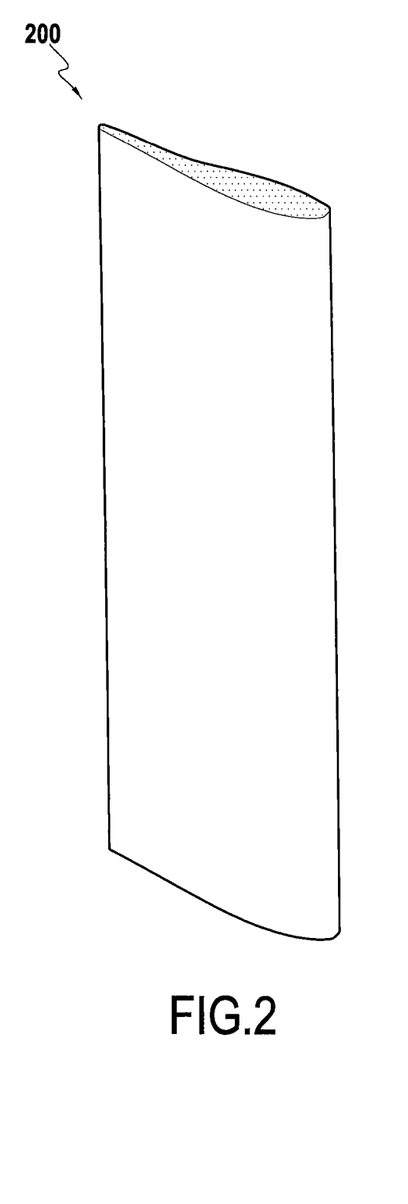
FIG. 2 is a highly diagrammatic illustration of making a multilayer woven fiber blank for making a vane of the stator sector shown in FIGS. 1A and 1B.

FIG. 2 is a highly diagrammatic view of a fiber blank 200 from which a vane fiber preform can be shaped so that after being densified with a matrix and machined, a composite material vane is obtained such as the vanes 110 shown in FIGS. 1A and 1B.

In this example, the blank 200 is obtained by three-dimensional weaving or multilayer weaving between a plurality of warp and weft yarns. After shaping, the fiber blank 200 is to constitute a vane preform. The blank 200 may present varying thickness that is determined as a function of the thickness of the profile of the vane that is to be made.

Figure 3:
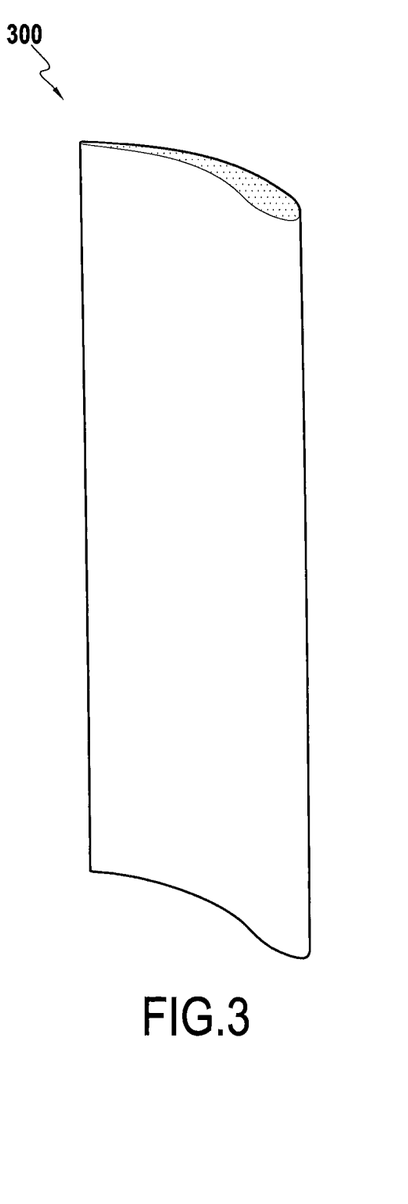
FIG. 3 shows a fiber preform made from the FIG. 2 fiber blank for a stator sector vane as shown in FIGS. 1A and 1B.
Figure 4:
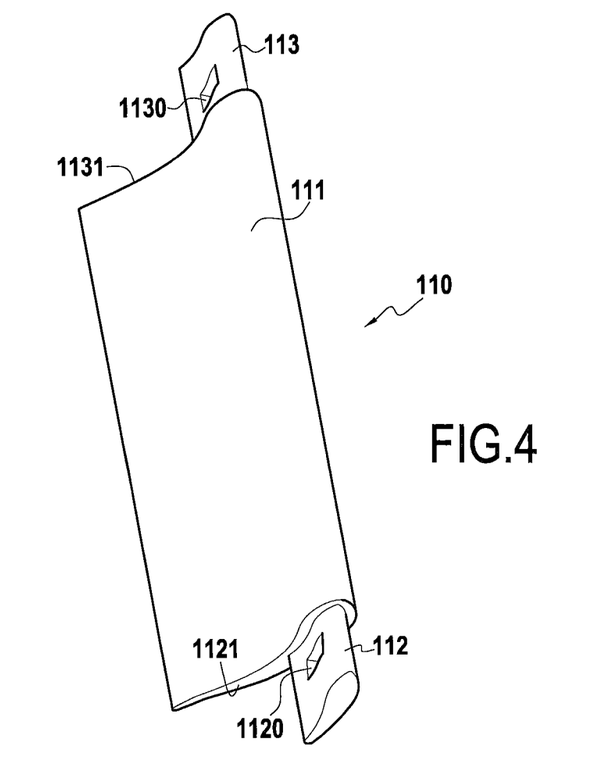
FIG. 4 is a perspective view of a vane made of composite material for the stator sector of FIGS. 1A and 1B as obtained from the fiber preform of FIG. 3.

A fiber preform 300 of the blade that is to be made is then obtained by molding, with the blank 200 being deformed so as to reproduce the curved profile of the vane, as shown in FIG. 3. After initial densification serving to obtain a preform that is capable of conserving its shape, the preform 300 is machined so as to form a preform portion constituting the airfoil, a preform portion constituting the inner end of the vane presenting dimensions smaller than the dimensions of the preform portion for the airfoil and including a slot or notch, and a preform portion for the outer end of the vane presenting dimensions smaller than those of the preform portion for the airfoil and including a slot or notch. As shown in FIG. 4, a vane 110 is thus obtained that comprises the airfoil 111 that extends between an inner end 112 and an outer end 113, each having a respective slot 1120, 1130. Although the inner end 112 is of a shape similar to that of the airfoil 111, it is nevertheless of dimensions that are smaller than the dimensions of the airfoil so as to define a shoulder 1121 that extends all around the inner end 112. Likewise, although the outer end 113 is of a shape similar to the shape of the airfoil 111, it nevertheless presents dimensions that are smaller than those of the airfoil so as to define a shoulder 1131 that extends all around the inner end 113.

In an embodiment, the yarns that are used may be yarns of silicon carbide (SiC) that are obtainable under the name "Nicalon" from the Japanese supplier Nippon Carbon and presenting a filament count of 0.5K (500 filaments).

Naturally, depending on the filament counts of the available yarns, various combinations of numbers of layers of yarns and variations of compactness and of filament count can be adopted for the profile that is to be obtained.

By way of example, for weaving the fiber blank 200, the weaving used may involve weaving multiple layers with a satin or multi-satin type weave. Other types of multilayer weaving could be used, e.g. multilayer weaving with a multi-plain weave or with an interlock weave. An interlock weave is a weave in which each layer of weft yarns interlinks a plurality of layers of warp yarns with all of the yarns in a given weft column having the same movement in the weave plane.

Various multilayer modes of weaving are described in particular in Document WO 2006/136755, the content of which is incorporated herein by way of reference.

The fiber blank that is to form the fiber reinforcement of the vane may also be obtained by stacking a plurality of layers of:

unidimensional (UD) fabric;
two-dimensional (2D) fabric;
braid;
knitted fabric;
felt; and/or
unidirectional (UD) sheet of yarns or tows or multidirectional (nD) sheets obtained by superposing a plurality of UD sheets in different directions and interlinking the UD sheets, e.g. by stitching, by a chemical bonding agent, or by needling.

The layers are interlinked, e.g. by stitching, by implanting yarns or rigid elements, or by needling.

Figure 5:
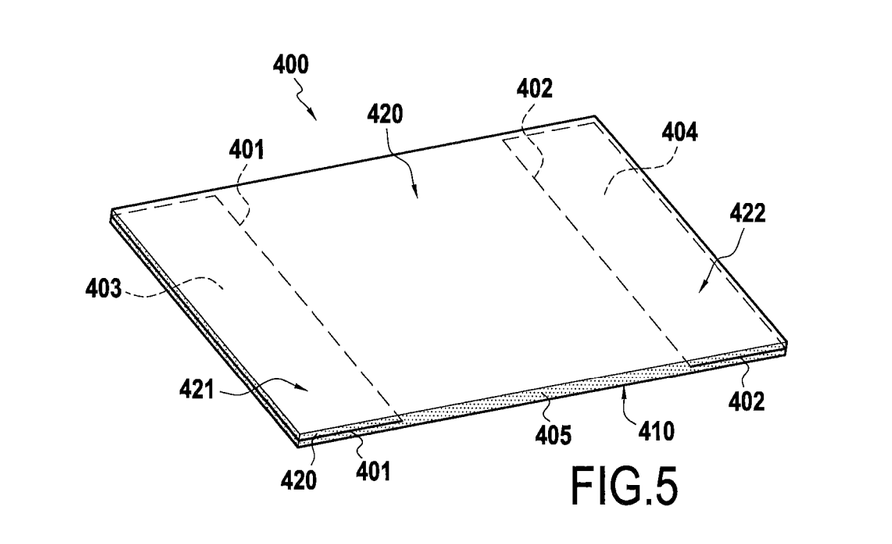
FIG. 5 is a highly diagrammatic illustration of making a multilayer woven fiber blank for making an inner platform of the stator sector of FIGS. 1A and 1B.

FIG. 5 is highly diagrammatic, showing a fiber blank 400 for forming the fiber reinforcement of the inner platform and from which it is possible to shape an inner platform fiber preform after an initial densification with a matrix serving to obtain a preform capable of conserving its shape, and then machining said densified preform, in order to obtain an inner platform 120 as shown in FIGS. 1A and 1B.

In the presently-described example, the fiber blank 400 is obtained, as shown diagrammatically in FIG. 5, by multi-layer weaving being a plurality of layers of warp yarns and a plurality of layers of weft yarns. The multilayer weaving may in particular involve an interlock weave, i.e. a weave in which each layer of weft yarns interlinks a plurality of layers of warp yarns with all of the yarns of a given weft column having the same movements in the weave plane.

The blank 400 has first and second portions 410 and 420 that are to form respectively the platform 122 constituting the flow passage and the hooks 123 and 124. During weaving, first and second lines 401 and 402 of non-interlinking are made inside the fiber blank between two successive layers of warp yarns situated at the boundary between the portions 410 and 420 and over two respective zones 403 and 404 of non-interlinking. The portions 410 and 420 are interlinked in an interlinking zone 405 situated between the two zones 403 and 404 of non-interlinking. The non-interlinking starting at the lines 401 and 402 serves to form two respective portions 421 and 422 that can be folded while shaping the blank in order to end up forming the hooks 123 and 124.

The fiber blank that is to form the inner platform may also be obtained by assembling together two fiber fabrics corresponding respectively to the first and second portions 410 and 420 of the above-described fiber blank 400. Under such circumstances, the two fiber fabrics are interlinked, e.g. by stitching or needling, only in the interlinking zone 405 so as to form two portions 421 and 422 that can be folded while the blank is being shaped in order to end up forming the hooks 123 and 124. The two fiber fabrics corresponding respectively to the first and second portions 410 and 420 may in particular each be obtained from a layer or a stack of a plurality of layers of:
unidimensional (UD) fabric;
two-dimensional (2D) fabric;
braid;
knitted fabric;
felt; and/or
unidirectional (UD) sheet of yarns or tows or multidirectional (nD) sheets obtained by superposing a plurality of UD sheets in different directions and interlinking the UD sheets, e.g. by stitching, by a chemical bonding agent, or by needling.

When stacking a plurality of layers, they are interlinked, e.g. by stitching, by implanting yarns or rigid elements, or by needling.

Figure 6:
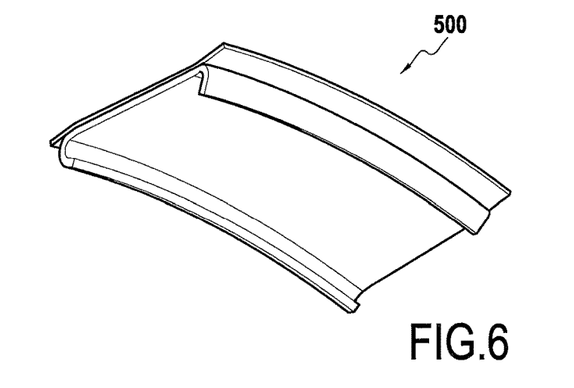
FIG. 6 shows a fiber preform for an inner platform of a stator sector as shown in FIGS. 1A and 1B being made from the fiber blank of FIG. 5.

FIG. 6 is a highly diagrammatic view of a fiber preform 500 for the inner platform that is to be made, and that is subsequently obtained by molding and deforming the entire preform in order to obtain a circularly arcuate general shape, with the portion 410 being deformed so as to reproduce shapes similar to those of the inner surface for reconstituting the flow passage, and with the portions 421 and 422 of the portion 420 being folded so as to reproduce shapes similar to those of the fastener portions of the hook.

After initial densification, the preform 500 is machined in order to form an opening of shape and dimensions equivalent to those of the inner platform that is to be made.

Figure 7:
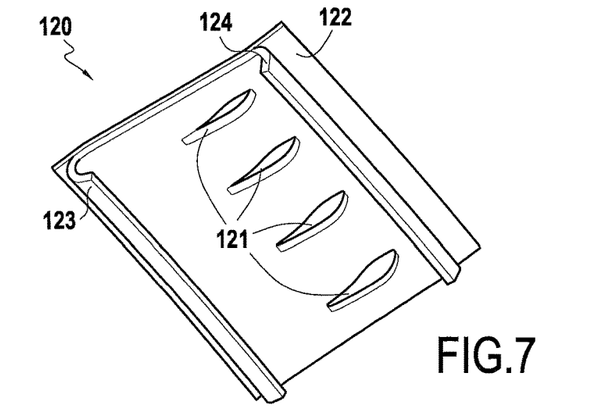
FIG. 7 is a perspective view of the inner platform made of composite material for the stator sector of FIGS. 1A and 1B as obtained from the fiber preform of FIG. 6.

As shown in FIG. 7, this produces an inner platform 120 of circularly arcuate shape having a platform 122 constituting a flow passage, hooks 123, 124, and openings 121 of shape equivalent to the shape of the inner ends 112 of the vanes 110, but of dimensions that are greater than the dimensions of the inner ends 112, as explained below.

Figure 8:
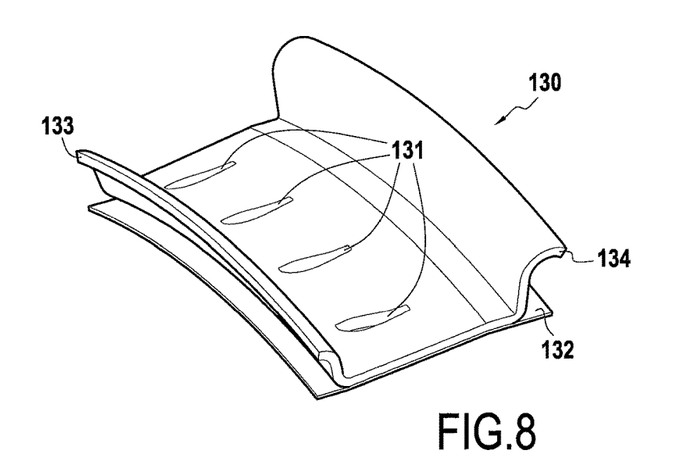
FIG. 8 is a perspective view of the outer platform made of composite material for the stator sector of FIGS. 1A and 1B.

The outer platform 130 shown in FIG. 8 is obtained in the same manner as that described above for making the inner platform 120. The steps involved in making the outer platform are therefore not described again for reasons of simplicity. The outer platform 130 as obtained in this way is of circularly arcuate shape and has platform 132 constituting a flow passage, attachment tabs 133, 134, and openings 131 of shape equivalent to the shape of the outer ends 113 of the vanes 110, but of dimensions greater than the dimensions of the outer ends 113, as explained below.

In order to avoid having differential coefficients of thermal expansion between the vanes and the platforms, these elements are preferably all made out of the same kinds of fibers and matrix.

Figure 9:
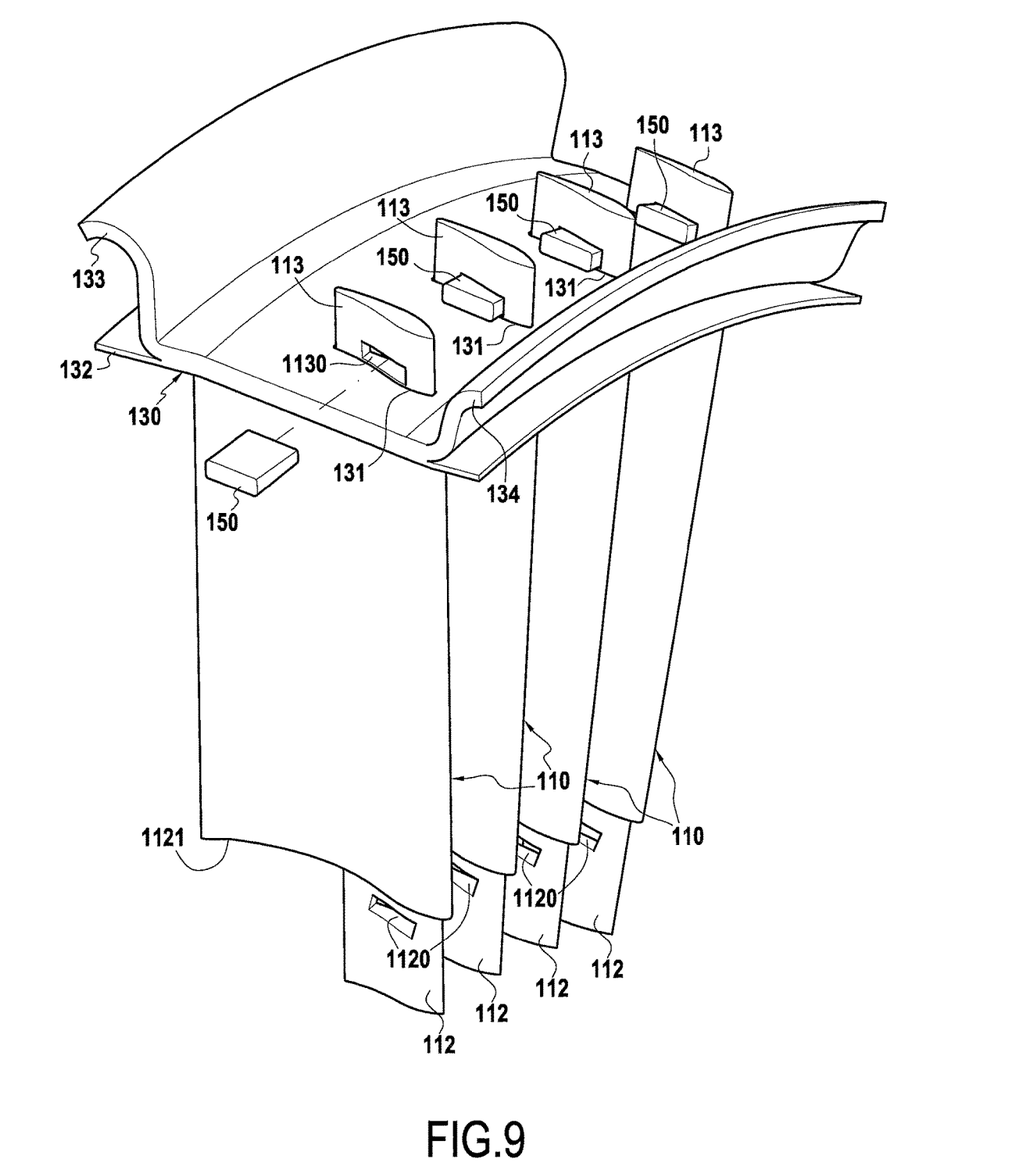
FIG. 9 is a perspective view showing the outer platform and the vanes being assembled together while making the stator sector of FIGS. 1A and 1B.

There follows a description of making a stator sector by assembling together previously-prepared parts. As shown in FIG. 9, assembly begins by assembling the vanes 110 with the outer platform 130. For this purpose, the outer ends 113 of the vanes 110 are engaged in the openings 131 of the outer platform 130. A locking element 150, preferably made of the same composite material as the vane and the platform, is then inserted and adhesively bonded in each of the slots 1130 of the outer ends 113 projecting above the outer platform 130 so as to secure the assembly between the outer platform 130 and each of the vanes 110.

Figure 10:
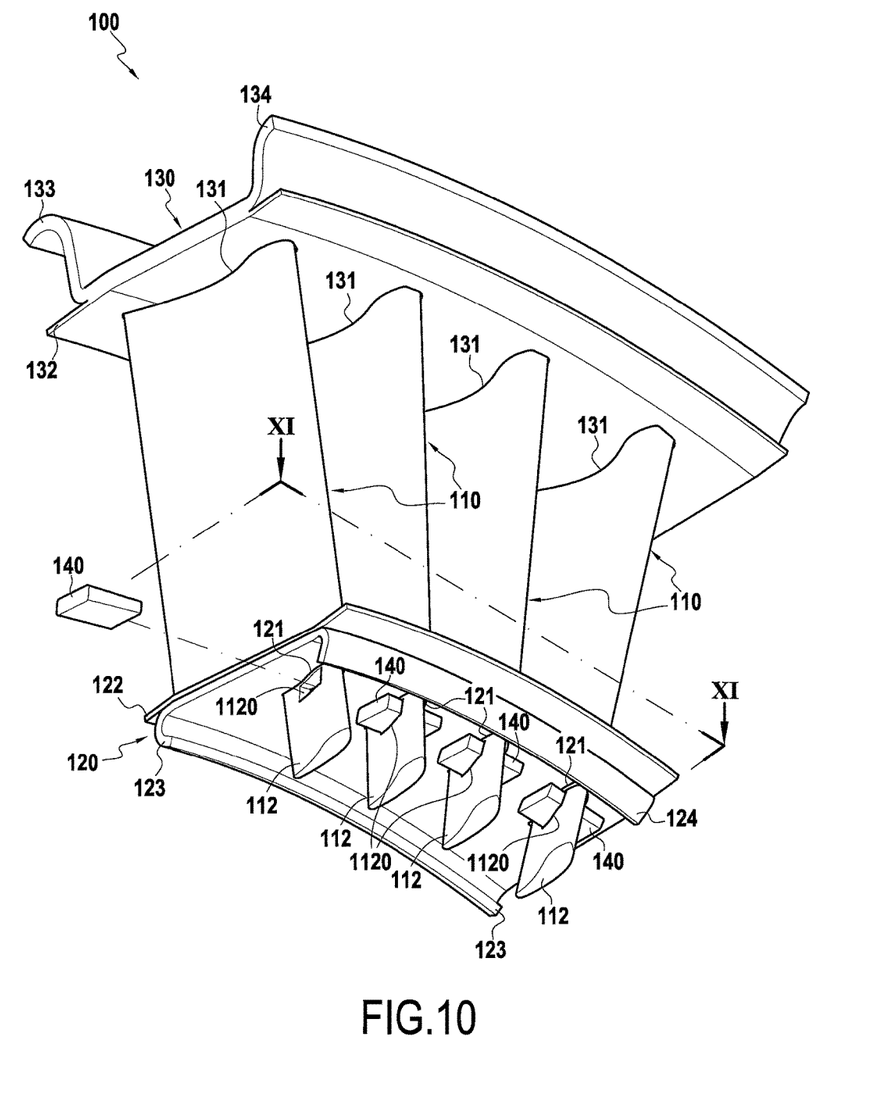
FIG. 10 is a perspective view showing the inner platform and the vanes being assembled together while making the stator sector of FIGS. 1A and 1B.

Thereafter, the inner platform 120 is assembled with the vanes 110 by engaging the inner ends 112 of the vanes in the openings 121 of the inner platform 120, as shown in FIG. 10. A locking element 140, that is preferably made of the same composite material as the vane and the platform, is then inserted and adhesively bonded in each of the slots 1120 of the outer ends 112 present beneath the inner platform 120 so as to secure the assembly between the inner platform 120 and the vanes 110.

The assembly is then subjected to densification that enables bonds to be created between the parts at their assembly interfaces by co-densification.

Assembly between the vanes 110 and the inner platform 120 is possible only because of the presence of clearance between the inner ends 112 of the vanes 110 and the openings 121 in the inner platform. Specifically, in order to comply with the circular shape of the final stator, the stator sector that is to be made needs to correspond to a portion of a circle having its radius of curvature defined by the inner and outer platforms. Under such circumstances, the vanes 110 are arranged radially between the inner and outer platforms, and one of the two platforms cannot be docked with the vanes in a direction normal to the axis of the vanes. In the presently-described embodiment, it is the outer platform 130 that is docked initially with the vanes 110. Docking can thus take place along the normal to the axes of the vanes so there is no need to leave clearance between the outer ends 113 of the vanes and the openings 131 in the outer platform 130. In contrast, once the vanes 110 are assembled with and secured to the outer platform 130 so as to present a circularly arcuate shape, it is not possible to engage the inner ends 112 of the vanes in the openings 121 of the inner platform 120 without some clearance being provided in the docking direction between these openings and the inner ends of the vanes.

Figure 11:
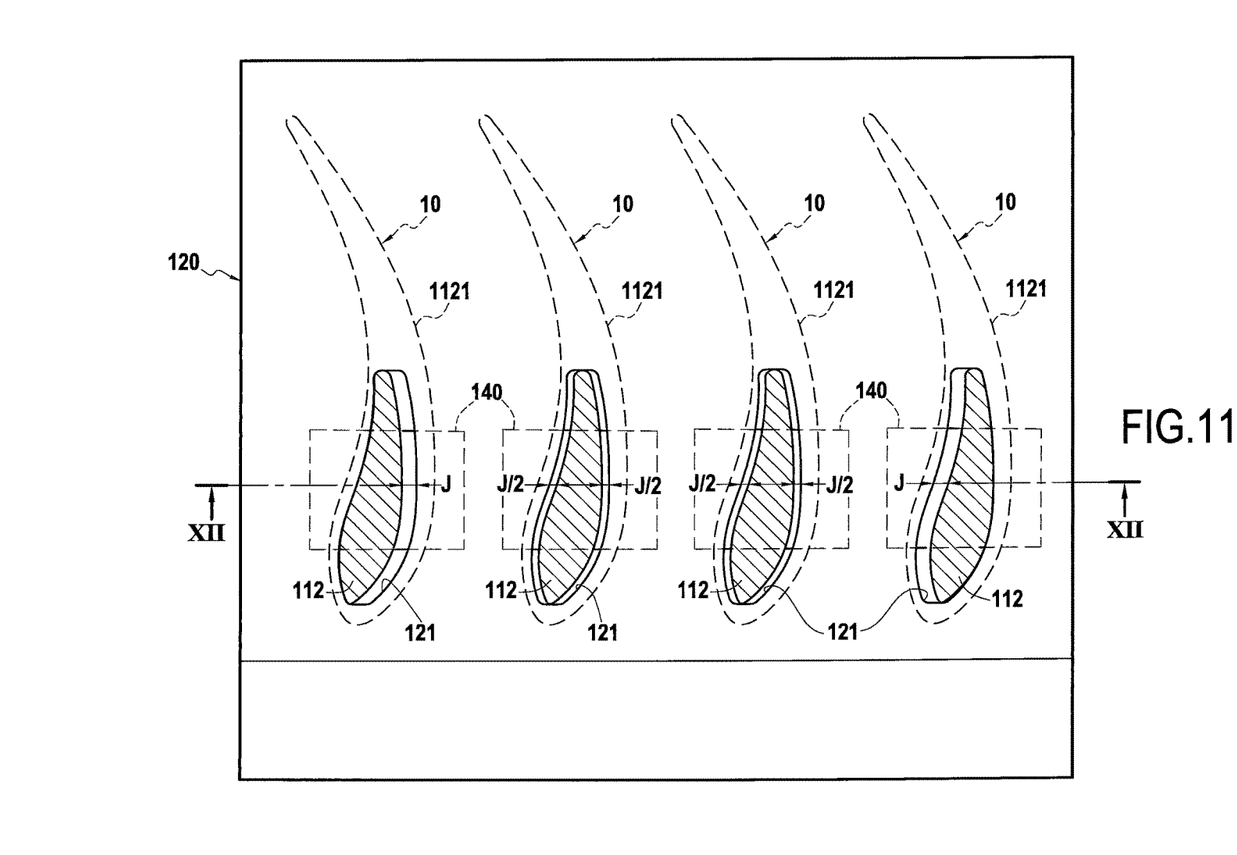
FIG. 11 is a view from beneath showing the clearance present between the inner ends of the vanes and the openings in the inner platform.
Figure 12:
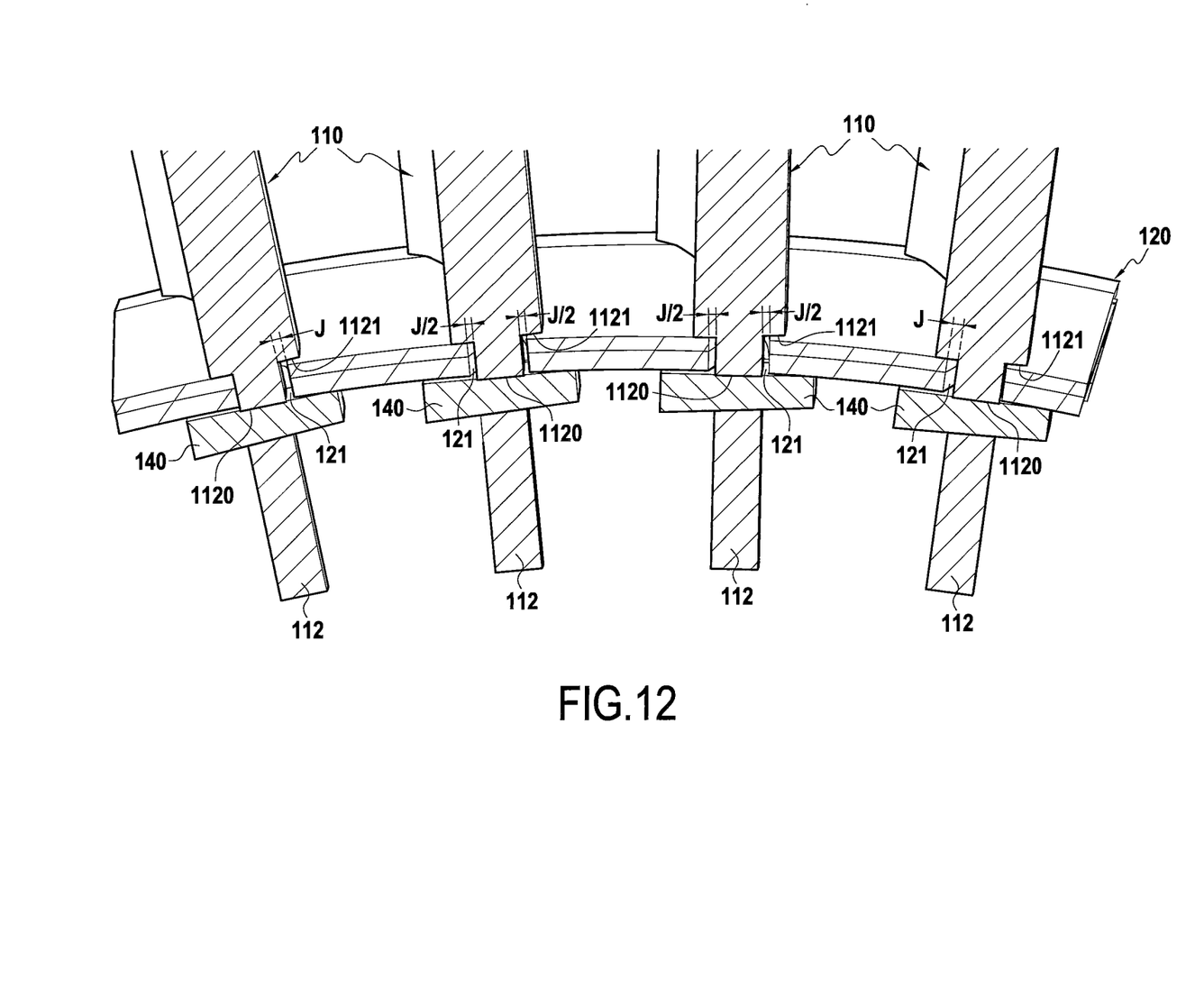
FIG. 12 is a section view on line XII-XII of FIG. 11 showing the clearance present between the inner ends of the vanes and the openings in the inner platform.

As shown in FIGS. 11 and 12, since the openings 121 are of dimensions greater than the dimensions of the openings 121, clearance J is present between the inner ends 112 and the openings 121 in the docking direction between these elements. This clearance J is distributed as a function of the position of the vane for docking with the inner platform. The clearance J is distributed on both sides of the inner ends 112 of the vanes 110 situated in the center of the inner platform 120, whereas it is situated mainly on one side only of the inner ends 112 of the vanes situated at the ends of the inner platform 120.

The clearance J thus present between the inner ends 112 of the vanes 110 and the openings 121 of the inner platform 120 thus enables the platform to be assembled with all of the vanes that have already been assembled and secured to the outer platform.

Furthermore, in order to maintain sealing between the vanes and the inner platform in the presence of such clearance, and in order to avoid head losses, each of the vanes 110 has a shoulder 1121 that extends all around the inner end 112 and that presents dimensions that are greater than the dimensions of the openings 121 in the inner platform 120. Thus, after the inner platform 112 has docked with and been secured to the vanes 110, the shoulders 1121 are in contact with the top surface 112a of the platform 112, thus making it possible to isolate the flow passage from the spaces present between the inner ends 112 and the openings 121 (FIGS. 11 and 12).

The stator sector 100 is preferably made out of ceramic matrix composite (CMC) material, i.e. parts made up of reinforcement made of refractory fibers (carbon or ceramic fibers) and densified with a matrix that is at least partially ceramic. Examples of CMC materials include C/SiC composites (carbon fiber reinforcement and silicon carbide matrix), C/C—SiC composites (carbon fiber reinforcement and matrix comprising both a carbon phase, generally closer to the fibers, and also a silicon carbide phase), SiC/SiC composites (both reinforcing fibers and matrix made of silicon carbide), and oxide/oxide composites (both reinforcing fibers and matrix made of alumina). An interphase layer may be interposed between the reinforcing fibers and the matrix in order to improve the mechanical strength of the material.

Densification of the fiber preform that is to form the fiber reinforcement of each part that is to be made consists in filling in the pores of the preform throughout all or part of its volume with the material that constitutes the matrix. This densification may be performed in known manner, either by using a liquid technique or by using a gas technique such as chemical vapor infiltration (CVI), or indeed by using both of these techniques one after the other.

The liquid technique consists in impregnating the preform with a liquid composition containing a precursor for the material of the matrix. The precursor is usually in the form of a polymer, such as a high performance epoxy resin, possibly diluted in a solvent. The preform is placed in a mold suitable for being closed in sealed manner so as to leave a recess having the shape of the final part. Thereafter, the mold is closed and the liquid precursor for the matrix (e.g. a resin) is injected throughout the recess in order to impregnate all of the fiber portion of the preform.

The precursor is transformed into the matrix, i.e. it is polymerized, by applying heat treatment, generally by heating the mold, after eliminating the solvent, if any, and after curing the polymer, with the preform continuing to be held in the mold of shape matching the shape of the part that is to be made.

When forming a ceramic matrix, the heat treatment consists in pyrolyzing the precursor in order to transform the matrix into a carbon or ceramic matrix depending on the precursor used and on pyrolysis conditions. For example, liquid precursors of ceramic, in particular of SiC, may be resins of the following types: polycarbosilane (PCS), or polytitanocarbosilane (PTCS), or polysilazane (PSZ). A plurality of consecutive cycles from impregnation to heat treatment may be performed in order to reach a desired degree of densification.

The fiber preform may also be densified in known manner by a gas technique by chemical vapor infiltration (CVI). The fiber preform corresponding to the fiber reinforcement of the part that is to be made is placed in an oven into which a reaction gas phase is admitted. The pressure and the temperature inside the oven and the composition of the gas phase are selected so as to enable the gas phase to diffuse within the pores of the preform in order to form the matrix therein by depositing a solid material in the core of the material and in contact with the fibers, which solid material results from one of the components of the gas phase decomposing or from a reaction between a plurality of components, as contrasted with the pressure and temperature conditions that are specific to chemical vapor deposition (CVD) methods, which lead to material being deposited exclusively on the surface of the material.

An SiC matrix may be obtained using methyltricholosilane (MTS) that gives SiC as a result of the MTS decomposing.

Densification combining the liquid technique and the gas technique can also be used in order to facilitate working, limit costs, and reduce fabrication cycles, while nevertheless obtaining characteristics that are satisfactory for the intended utilization.

The first densification performed individually on each fiber preform for a vane, an inner platform, an outer platform, and locking elements may be performed using the liquid technique, the gas technique, or a combination of both techniques.

Figure 13:
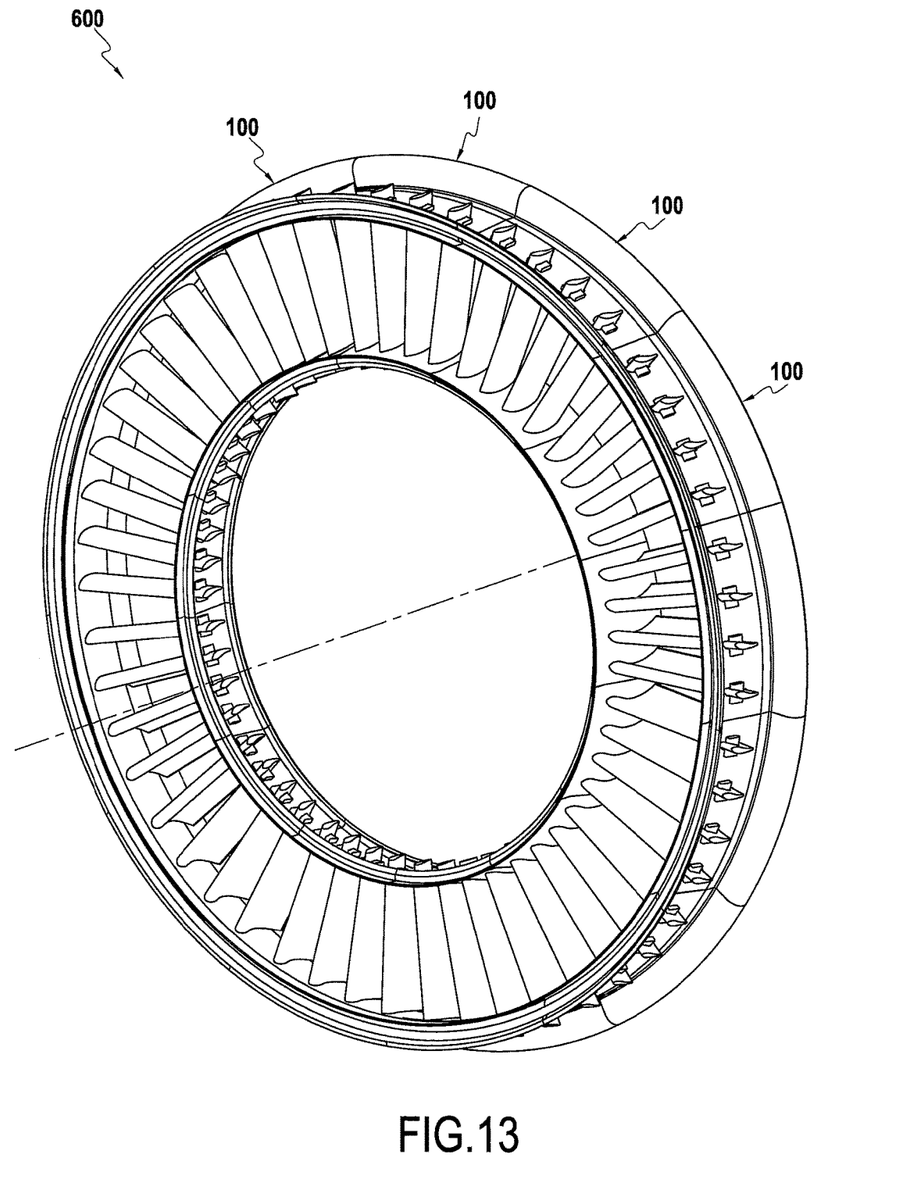
FIG. 13 is a perspective view of a turbine engine stator formed by uniting a plurality of stator sectors of FIGS. 1A and 1B.

FIG. 13 shows a stator 600 obtained by uniting a plurality of above-described stator sectors 100, the stator 600 being suitable for constituting a low pressure nozzle for an aeroengine turbine.

In the above-described stator sector 100, clearance is left between the inner ends and the openings in the inner platform so as to make it possible, when making the stator sector, to assemble the vanes with the inner platform after they have been assembled with the outer platform. Nevertheless, the invention is not limited to assembly in that order. The stator sector of the invention could be made by beginning by assembling the vanes with the inner platform and then with the outer platform. Under such circumstances, the openings in the outer platform that are to receive the outer ends of the vanes present dimensions greater than the dimensions of the outer ends of the vanes so as to leave clearance between the openings and the outer ends and thus enable the outer platform to be assembled with vanes that have already been assembled with the inner platform and secured thereto.

The invention claimed is:

1. A method of fabricating a sector of a turbine engine stator, the method comprising:
    making a plurality of single-piece vane fiber blanks;
    shaping the fiber blanks in order to obtain single-piece vane fiber preforms;
    densifying the vane fiber preforms with a matrix in order to obtain composite material vanes, each comprising fiber reinforcement constituted by the fiber preform and densified by the matrix;
    machining each vane to form a first end and a second end defining between them an airfoil, each first end having dimensions smaller than the dimensions of the airfoil so as to define a shoulder extending around the first end;
    making respective slots or notches in the first and second ends of the vanes;
    making a fiber blank for a first platform and a fiber blank for a second platform;
    shaping the fiber blanks to obtain a single-piece fiber preform for the first platform in the form of a circular arc and a single-piece fiber preform for the second platform in the form of a circular arc the single-piece fiber preform for the second platform having hooked portions configured and arranged to support and hold axially in position a sealing system for rotor discs, wherein the shaping includes forming a portion of non-interlinked weave between two successive layers of warp yarns over two respective zones separated by an interlinked weave zone, the shaping further including folding the non-interlinked portions to form the hooked portions;

densifying the single-piece preforms for the first and second platforms with a matrix in order to obtain first and second platforms made of composite material and in the form of circular arcs comprising fiber reinforcement constituted by the single-piece preform and densified by the matrix;

making openings in the first and second platforms, each opening in the first platform having a continuous and surrounding edge and the openings of the first platform presenting dimensions greater than the dimensions of the first ends of the vanes, the shoulder extending all around each first end and presenting dimensions greater than the dimensions of the openings in the first platform;

engaging the second ends of the vanes in the openings of the second platform;

placing a locking element in each slot or notch at the second ends of the vanes to form a mortise and tenon joint;

engaging the first ends of the vanes in the openings of the first platform such that the continuous edge of each opening in the first platform is in continuous contact with at least a portion of the shoulder of each corresponding first end of each vane; and placing a locking element in each slot or notch at the first ends of the vanes to form a mortise and tenon joint.

2. A method according to claim 1, wherein the vanes, the first platform, the second platform, and the locking elements are made of ceramic matrix composite (CMC) material.

3. A sector for a turbine stator, the sector comprising:
a plurality of vanes of composite material comprising fiber reinforcement densified by a matrix, each vane having an airfoil extending between a first end and a second end,
a first platform and a second platform, the first and second platforms being in the form of circular arcs of composite material comprising fiber reinforcement densified by a matrix, the first platform having openings in which the first ends of the vanes are engaged, and the second platform having openings in which the second ends of the vanes are engaged, each opening of the first platform having a continuous and surrounding edge, wherein each continuous edge is in continuous contact with at least a portion of the corresponding first end of a corresponding vane, and wherein the first platform further has hooked portions configured and arranged to support and hold axially in position a sealing system for rotor discs, formed by a portion of non-interlinked weave between two successive layers of warp yarns over two respective zones separated by an interlinked weave zone, and by folding the non-interlinked portions to form the hooked portions;
wherein the openings in the first platform present dimensions that are greater than the dimensions of the first ends of the vanes engaged in said openings so as to leave clearance between the first ends of each of the vanes and the openings, and
wherein each vane first end engaged in said opening presents dimensions smaller than the dimensions of the airfoil so as to define a shoulder extending all around said first end, the shoulder presenting dimensions greater than the dimensions of the openings of the first platform and being in contact with the surface of the first platform, and wherein the first and second platform and the vane first and second ends are configured and arranged to be connected in a mortise and tenon arrangement.

4. A sector according to claim 3, wherein a portion of the second end of each vane extending beyond the second platform includes one slot or notch in which a locking element is placed.

5. A sector according to claim 3, wherein a portion of the first end of each vane extending beyond the first platform includes one slot or notch in which a locking element is placed.

6. A sector according to claim 3, wherein the vanes, the first platform, and the second platform are made of ceramic matrix composite (CMC) material.

7. A sector according to claim 3, wherein the first platform corresponds to an inner platform of the stator sector and wherein the first end of the airfoil corresponds to an inner end of said airfoil, the second platform corresponding to an outer platform of said stator sector and the second end of the airfoil corresponding to an outer end of said airfoil.

8. A turbine engine stator having a plurality of sectors according to claim 3.

9. A turbine engine compressor having a stator according to claim 8.

10. A turbine engine having a compressor according to claim 9.

* * * * *